(12) United States Patent
Miyashita

(10) Patent No.: US 6,507,434 B2
(45) Date of Patent: Jan. 14, 2003

(54) ILLUMINATION APPARATUS FOR MICROSCOPE

(75) Inventor: Tomohiro Miyashita, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/884,034

(22) Filed: Jun. 20, 2001

(65) Prior Publication Data

US 2002/0012164 A1 Jan. 31, 2002

(30) Foreign Application Priority Data

Jun. 23, 2000 (JP) ........................................ 2000-189861

(51) Int. Cl.$^7$ ........................... G02B 21/06; G02B 27/10
(52) U.S. Cl. ........................ 359/387; 359/368; 359/619
(58) Field of Search ............................... 359/368–369, 359/385–390, 618–622, 434–435; 355/52–77

(56) References Cited

U.S. PATENT DOCUMENTS

| | | | | |
|---|---|---|---|---|
| 5,420,417 A | * | 5/1995 | Shiraishi | ..................... 250/205 |
| 5,615,047 A | * | 3/1997 | Komatsuda et al. | ......... 359/618 |
| 5,713,660 A | * | 2/1998 | Mori et al. | .................. 362/268 |
| 5,760,963 A | * | 6/1998 | Mori | ........................... 359/622 |
| 5,946,138 A | * | 8/1999 | Mizouchi | ..................... 359/618 |
| 6,259,557 B1 | * | 7/2001 | Miyashita et al. | ........... 359/385 |

FOREIGN PATENT DOCUMENTS

| | | |
|---|---|---|
| JP | 59-111124 | 6/1984 |
| JP | 2000-122178 | 4/2000 |

* cited by examiner

Primary Examiner—Thong Nguyen

(57) ABSTRACT

An illumination apparatus, having a light source that supplies illumination light, a collector lens that converts a divergent light flux emitted from the light source into a plurality of substantially parallel light fluxes, a fly-eye lens, comprised of a plurality of small lens elements and an exit surface, disposed at a rear focal position of the collector lens and a relay optical system that relays a pseudo plane light source which is formed on the exit surface of the fly-eye lens to an aperture stop or a surface conjugate to the aperture stop, where a focal length of at least one of the plurality of small lens elements is 8≦focal length ≦24, a radius of at least one of the plurality of small lens elements is 1≦ radius ≦3 and a consistent unit of length is used for the focal length and radius.

5 Claims, 2 Drawing Sheets

ILLUMINATION APPARATUS FOR MICROSCOPE

This application claims the benefit of Japanese Patent Application No. 2000-189861 which is hereby incorporated by reference.

BACKGROUND OF THE INVENTION

1. Field of the Invention

The present invention relates to an illumination apparatus for a microscope, and particularly to an illumination apparatus for microscope which is suitable for a photographing operation of a digital camera, or the like.

2. Related Background Art

Recently, a video image of high quality can be obtained with advancement in digital cameras with higher pixels. Though an image observed by a microscope was conventionally recorded by silver salt photography mainly, photography with a digital camera is increasingly employed for this purpose. Furthermore, in the fields of biology and medical treatments, electronization of clinical records is recently proposed. In addition, in the industrial fields, an image phototaken by a digital camera or a video camera is often observed by a television monitor, rather than by visual inspection, so as to improve a throughput in the inspecting process. Thus, it is estimated that further digitization advances in the field of observation by a microscope.

However, a charge coupled device (CCD) used in a digital camera, or the like, is sensitive to a change in brightness, compared with a film used for the silver salt photography. For this reason, in an image pickup operation by a digital camera, irregular illumination which was not a substantial problem in the prior art becomes a very serious drawback. As a result, there is a demand for an illumination system with less irregularity in illumination, compared with a conventional one, also in an illumination apparatus for a microscope.

SUMMARY OF THE INVENTION

The present invention was contrived taking the above problem into consideration, and an object of the invention is to provide a microscopic illumination apparatus which exhibits less irregularity in illumination and can obtain an excellent observed image even when using a digital camera, or the like.

In order to solve the above problem, according to the present invention, there is provided a microscopic illumination apparatus, comprising:

a light source for supplying illumination light;

a collector lens for converting a divergent light flux emitted from the light source into substantially parallel light fluxes;

a fly-eye lens disposed at a rear focal position of the collector lens; and a relay optical system for relaying a pseudo plane light source which is formed on an exit end surface of the fly-eye lens to an aperture stop or a surface conjugate to the aperture stop, wherein the following conditions are satisfied:

(1) $8 \leq f \leq 24$; and (2) $1 \leq d \leq 3$, where f is the focal length of one element for constituting the fly-eye lens, and d is the radius of the one element for constituting the fly-eye lens; and the unit in the conditions (1) and (2) is preferably "mm".

The conditions (1) and (2) define an appropriate focal length and radius of the element for constituting the fly-eye lens. Below the lower limit of both of the conditions (1) and (2), the size of the fly-eye lens is reduced beyond manufacturing practicality. In addition, the manufacturing cost is increased. On the contrary, above the upper limit of the conditions (1) and (2), the distance between the fly-eye lens and the relay lens following this fly-eye lens is increased, whereby the size of the illumination system is also increased. In addition, with the enlargement of each element of the fly-eye lens, the averaging effect of the illumination light is decreased.

According to a preferred embodiment of the invention, a cross section of the optical element for constituting the fly-eye lens is preferably hexagonal. In case the cross section is hexagonal, d denotes the radius of a circle inscribed in the hexagon.

According to another preferred embodiment, the relay optical system is preferably a reduction relay system. With this relay system, a bright image can be obtained.

According to still another preferred embodiment, the relay optical system preferably contains at least one or more cemented lenses. The reason that the relay optical system employs a cemented lens is to correct an aberration when a field stop FS is imaged on a sample surface.

According to still another preferred embodiment, it is preferable that a diffusing plate is inserted into a space between the fly-eye lens and the relay optical system, whereby pupil unevenness can be prevented.

According to still another preferred embodiment, the fly-eye lens is preferably manufactured by integral injection molding of plastic or glass. For instance, it is possible to manufacture, by integral injection molding, two optical members each having one surface on which each element of the fly-eye lens has a curvature and the other surface which is formed flat, so as to use these two members in such a manner that the flat surfaces of the both members are opposite to each other. Since an air layer is provided in this manner, the size of the apparatus can be compact when the focal length is the same. Also, compared with a case in which the whole fly-eye lens is integrally formed, the volume of a member to be pressed can be decreased, so as to reduce an amount of thermal contraction after pressing.

BRIEF DESCRIPTION OF THE DRAWINGS

FIG. 2 is comprised of FIG. 2A and FIG. 2B for showing a distribution of the intensity of illumination light, in which

DETAILED DESCRIPTION OF THE PREFERRED EMBODIMENTS

Figure 1:
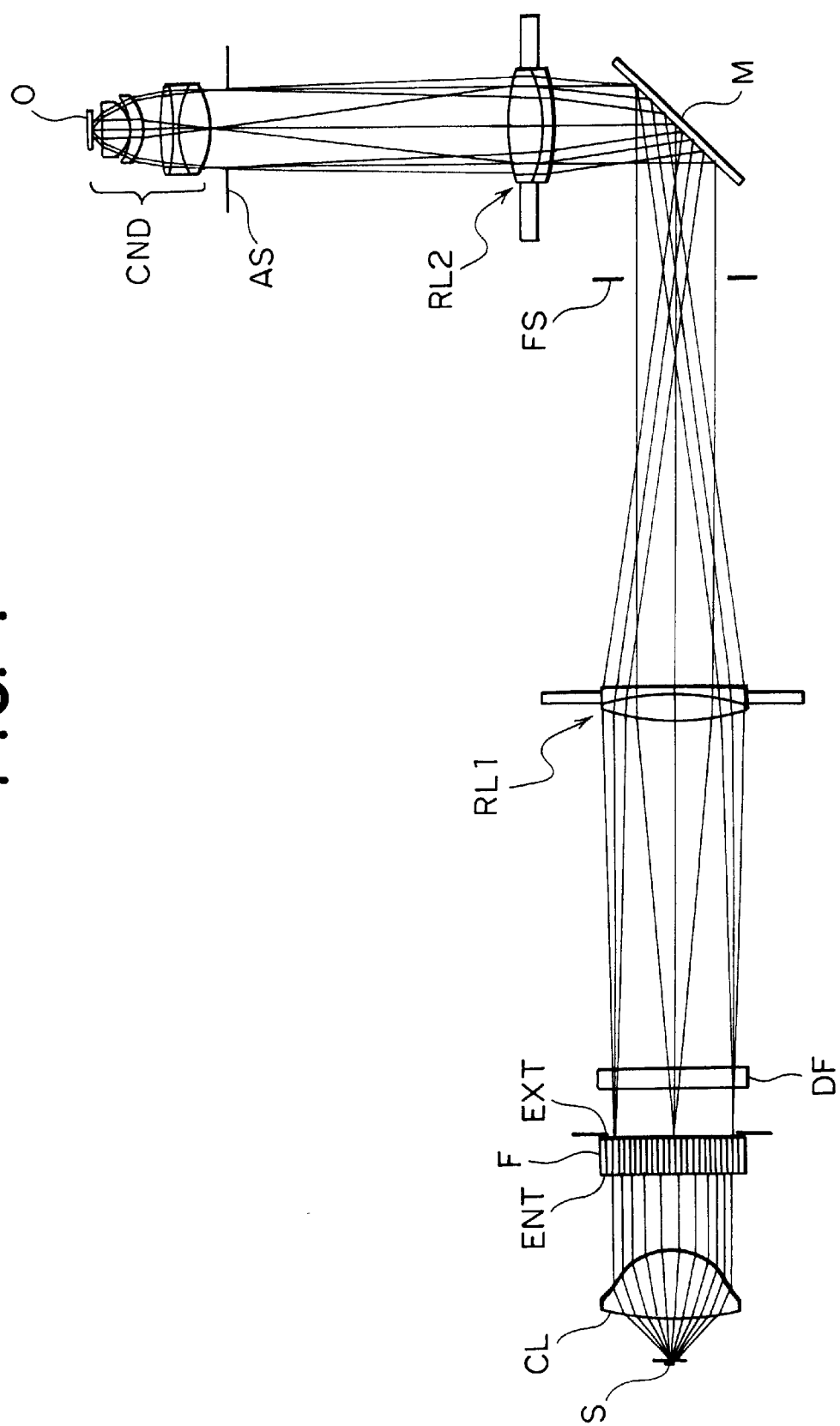
FIG. 1 is a view for showing a schematic constitution of a microscopic illumination apparatus according to an embodiment of the present invention.

Description will be made on a microscopic illumination apparatus according to an embodiment of the present invention with reference to the attached drawings. FIG. 1 is a view for showing a schematic constitution of the microscopic illumination apparatus. Referring to FIG. 1, a divergent light flux emitted from a light source S is converted into light fluxes substantially parallel to each other by a collector lens CL. In this case, at a rear focal position of the collector lens CL, a surface conjugate to a field stop FS is formed. A fly-eye lens F is disposed at this position so as to superpose on the entrance end surface ENT of the fly-eye lens F. On this occasion, on the exit end surface EXT of the fly-eye lens, there are formed light source images in the number corresponding to that of the elements of the fly-eye lens. For instance, if the filling rate is 104, a pseudo plane light source is formed on the entire fly-eye lens. Divergent light fluxes emitted from the respective elements of the fly-eye lens superpose on each other on the field stop FS, so that a uniform illumination without unevenness can be obtained even when the light source has a light distribution characteristic. The divergent light flux emitted from the exit surface EXT of the fly-eye lens F is passed through relay lens systems RL1, RL2 and a mirror M to be projected onto an aperture stop AS. A relay magnification is determined depending on the diameter of the whole fly-eye lens F, the size of the light source S, and a light source magnification to be obtained. According to a preferred embodiment of the present invention, a reduction relay system is desirable.

The pseudo plane light source is projected onto the aperture stop AS to illuminate an object plane O via a condenser lens CND. In this case, the fly-eye lens F is produced of plastic or glass by integral injection so that the fly-eye lens has a stable quality and can be provided at a low cost. Between the relay optical systems RL1 and RL2, a field stop FS surface is formed. Here, if a chromatic aberration remains in the relay optical systems RL1 and RL2, the stop appears to be tinged. For this reason, the relay optical systems preferably employ a cemented lens for correcting the chromatic aberration.

It was described above that the exit surface EXT of the fly-eye lens F serves as the pseudo plane light source. However, it is preferable that a cross section of one element of the fly-eye lens F is hexagonal in order to form a more uniform pseudo plane light source. In order to conduct further uniform illumination, it is desirable to dispose a diffusing plate DF between the fly-eye lens F and the relay optical system RL1.

Table 1 shows values for the specifications of a first numerical embodiment of the fly-eye lens which is provided in the present microscopic illumination apparatus. In the following specifications, r1 denotes the radius of curvature of a fly-eye lens element on the light source side, r2 the radius of curvature of the fly-eye lens element on the object side, d1 the thickness of the fly-eye lens along the optical axis, nd the refractive index with respect to the d line ($\lambda$=587.56 nm), vd an Abbe's number, f the focal length, and d the radius of one element of the fly-eye lens. It is noted that the same reference symbols are used in all of the following numerical embodiments.

As the unit for the focal length, the radius of curvature, and other lengths, "mm" is generally used. However, the unit is not limited to this, since the same optical performance can be obtained if the optical systems are proportionally enlarged or reduced.

TABLE 1

| | |
|---|---|
| r1 = 4.18 | d1 = 12.2 |
| r2 = −4.18 | nd = 1.522160 |
| vd = 58.8 | |
| f = 8 | d = 1 |

Table 2 shows values for the specifications of a second numerical embodiment of the fly-eye lens which is provided in the present microscopic illumination apparatus.

TABLE 2

| | |
|---|---|
| r1 = 8.27 | d1 = 24.2 |
| r2 = −8.27 | |
| nd = 1.51680 | |
| vd = 64.1 | |
| f = 16 | d = 2 |

Table 3 shows values for the specifications of a third numerical embodiment of the fly-eye lens which is provided in the present microscopic illumination apparatus.

TABLE 3

| | |
|---|---|
| r1 = 13.7 | d1 = 37.7 |
| r2 = −13.7 | |
| nd = 1.56883 | |
| vd = 56.1 | |
| f = 24 | d = 3 |

Figure 2A:
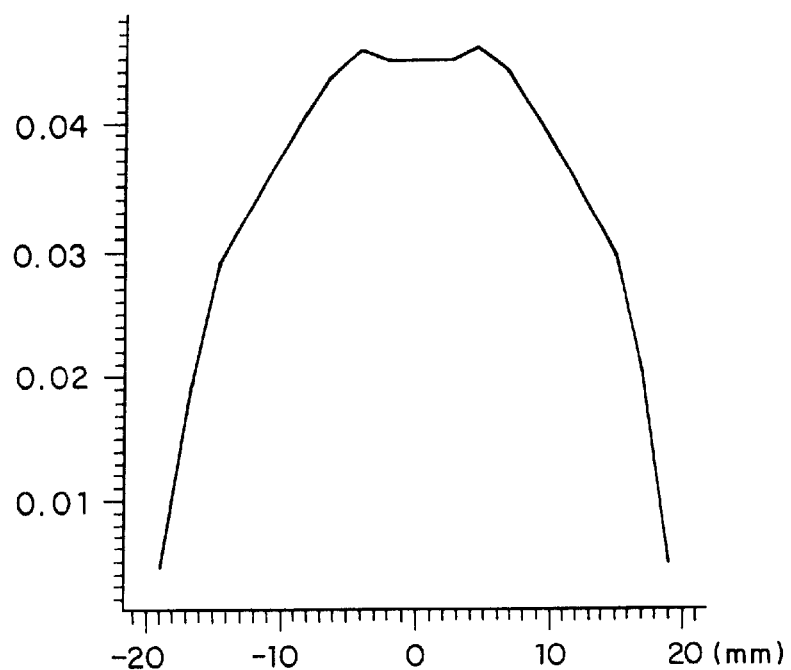
FIG. 2A is a graph when the fly-eye lens is not used.
Figure 2B:
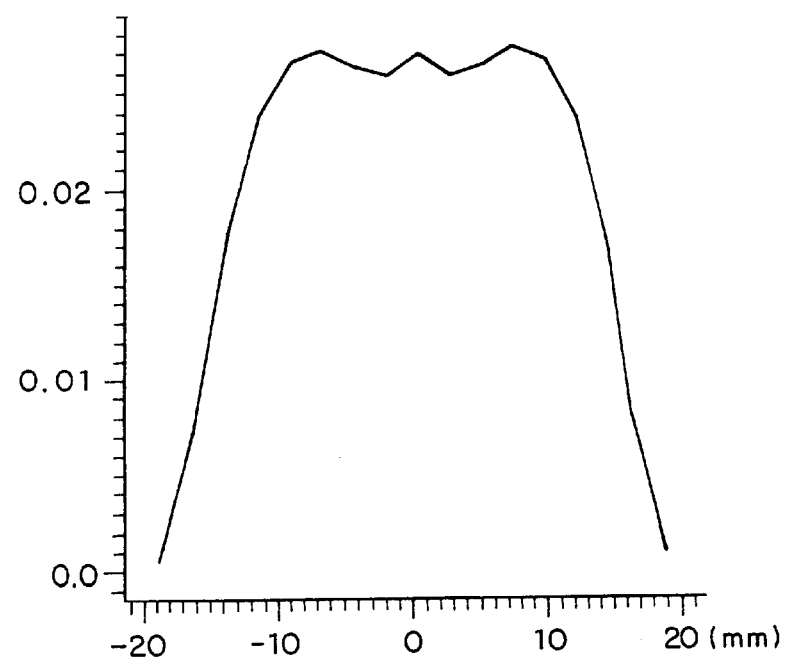
FIG. 2B is a graph when the fly-eye lens is used.

FIG. 2A shows an intensity distribution of an illumination light on the image field when no fly-eye lens is used, while FIG. 2B shows an intensity distribution of the illumination light on the image field when the fly-eye lens is used. In FIG. 2A and FIG. 2B, the abscissa represents the positional coordinate, and the ordinate represents a relative unit of the light intensity. As clearly seen from the drawings, the illumination irregularity is conspicuously reduced when the fly-eye lens is used.

Table 4 shows values for the specifications of the relay optical systems. In the following specifications, r denotes the radius of curvature of a lens surface, d the distance between the lens surfaces, nd the refractive index with respect to the d line ($\lambda$=587.56 nm), and vd an Abbe's number.

TABLE 4

| | | | |
|---|---|---|---|
| | d0 = 130 | | |
| r1 = 83.75 | d1 = 7 | nd = 1.5691 | vd = 71.3 |
| r2 = −96.5 | d2 = 2.5 | nd = 1.5268 | vd = 51.4 |
| r3 = ∞ | d3 = 215 | | |
| r4 = 100.0 | d4 = 3 | nd = 1.7569 | vd = 31.6 |
| r5 = 38.7 | d5 = 10 | nd = 1.6304 | vd = 60.1 |
| r6 = −85.0 | d6 = 90 | | |
| magnification = −0.68 | | | |

As described above, according to the present invention, it is possible to provide a microscopic illumination apparatus with less irregularity in illumination and capable of obtaining an excellent observed image even when a digital camera, or the like, is used.

What is claimed is:

1. An illumination apparatus, comprising:

a light source that supplies a divergent light flux;

a collector lens that converts the divergent light flux emitted from the light source into a plurality of substantially parallel light fluxes;

a fly-eye lens, comprised of a plurality of small lens elements and an exit surface, disposed at a rear focal position of the collector lens; and a relay optical system that relays a pseudo plane light source, which is formed on the exit surface of the fly-eye lens, to an aperture stop or a surface conjugate to the aperture stop, wherein a focal length of at least one of the plurality of small lens elements is 8 mm$\leq$focal lenght $\leq$24 mm, a cross-section of at least one of the plurality of small lens elements is a hexagon, and a radius d of a circle inscribed in the hexagon is 1 mm≦radius≦3 mm.

2. A microscopic illumination apparatus according to claim 1, wherein said relay optical system is a reduction relay system.

3. A microscopic illumination apparatus according to claim 1, wherein said relay optical system contains at least one or more cemented lenses.

4. A microscopic illumination apparatus according to claim 1, wherein a diffusing plate is inserted into a space between said fly-eye lens and said relay optical system.

5. A microscopic illumination apparatus according to claim 1, wherein said fly-eye lens is manufactured by integral injection of plastic or glass.

* * * * *